United States Patent [19]

Matsukawa et al.

[11] Patent Number: 5,614,585
[45] Date of Patent: Mar. 25, 1997

[54] HYDROPHILIC SURFACE-TREATING AQUEOUS SOLUTION AND HYDROPHILIC SURFACE-TREATING METHOD

[75] Inventors: Masahiko Matsukawa, Kawasaki; Hidekimi Hirasawa; Fujio Mikami, both of Yokohama; Katsuyoshi Yamasoe, Yotsukaido, all of Japan

[73] Assignee: Nippon Paint Co., Ltd., Osaka, Japan

[21] Appl. No.: 611,163

[22] Filed: Mar. 5, 1996

Related U.S. Application Data

[62] Division of Ser. No. 318,449, Oct. 5, 1994, Pat. No. 5,527,854.

[30] Foreign Application Priority Data

Oct. 6, 1993 [JP] Japan .................................. 5-250314

[51] Int. Cl.$^6$ .................................................. C23C 22/82
[52] U.S. Cl. .................... 524/608; 148/256; 148/257; 148/265; 148/251; 427/327; 427/435
[58] Field of Search ................................. 427/327, 435; 148/256, 257, 265, 251; 524/608

[56] References Cited

U.S. PATENT DOCUMENTS

| | | | |
|---|---|---|---|
| 2,904,526 | 9/1959 | Uelzmann | 524/313 |
| 4,243,417 | 1/1981 | Grourke et al. | 106/14.13 |
| 4,828,616 | 5/1989 | Yamasoe | 106/14.13 |
| 4,908,075 | 3/1990 | Yamasoe | 148/256 |
| 4,971,724 | 11/1990 | Kalota et al. | 252/390 |
| 4,973,359 | 11/1990 | Yamasoe | 106/14.13 |
| 5,096,958 | 3/1992 | Meguro et al. | 427/327 |

FOREIGN PATENT DOCUMENTS 0413260  2/1991  European Pat. Off. .

OTHER PUBLICATIONS

Derwent Abstracts 72-78878T, "Hair Lacquer-Containing Poly-Alpha-Amino Acid Salt as the Major Ingredient" Jan. 1965.
Chemical Abstracts, Abstract No. 80:109460 CA.

*Primary Examiner*—Frederick Krass
*Attorney, Agent, or Firm*—Sughrue, Mion, Zinn, Macpeak & Seas

[57] ABSTRACT

A hydrophilic surface-treating aqueous solution and a hydrophilic surface-treating method are provided to form a film which can maintain its hydrophilicity. The hydrophilic surface-treating aqueous solution contains as main components polyglutamic acid, basic compound, and aqueous resin if necessary. This surface-treating solution and method enable the forming of a film on the surface of aluminum series metals which are used for aluminum fins of heat exchangers, and confer the film's anticorrosion properties, superior hydrophilicity and high hydrophilic permanency, while remarkably suppressing an offensive odor.

4 Claims, No Drawings

HYDROPHILIC SURFACE-TREATING AQUEOUS SOLUTION AND HYDROPHILIC SURFACE-TREATING METHOD

This is a divisional of application Ser. No. 08/318,449 filed Oct. 5, 1994 and now U.S. Pat. No. 5,527,854.

BACKGROUND OF THE INVENTION

1. Field of the Invention

This invention generally relates to a hydrophilic surface-treating aqueous solution and hydrophilic surface-treating method, and more particularly, to a hydrophilic surface-treating aqueous solution and method used for forming an anticorrosive and hydrophilic film onto aluminum products such as aluminum fins of a heat exchanger.

2. Description of the Related Art

Aluminum and its alloys are widely utilized for heat exchangers due to their light-weight and superior processability and thermal conductivity. With the spread of air conditioning systems, a number of systems incorporating cooling, dehumidifying, and cooling/heating functions are available. In these air-conditioners, fins made of aluminum alloy are typically provided on the heat exchanging sections.

During the cooling mode of the air-conditioners, the moisture in the air tends to attach to the surface of the fins in the form of condensed water. In order to prevent the attachment of the condensed water, it could be conceived to confer a water repellency on the fin surface. However, the water repellency properties may cause the adhesion of hemispherical condensed water drops onto the fin surface and/or presence of bridge-like water between the fins. This will disadvantageously prevent the air flow of the heat exchanger and increase the ventilation resistance. Thus, the repellent fin surface may contribute to the reduction in heat exchanging efficiency.

Aluminum and its alloys originally have good anticorrosion characteristics. However, in the case where the condensed water remains on the fin surface for a long period of time, hydration reaction or corrosion reaction are accelerated due to the formation of the oxygen concentration cell on the fin surface and to the adhesion and condensation of the contaminated component in air. The corrosion products which have been produced by the above reaction accumulate on the fin surface, which will impair the heat exchange ability and during the warming operation in the winter season in winter cause the exhaust of white minute powder particles from the air fan together with the warmed air.

In order to solve the above problems, it has thus become desirable in recent years to improve the hydrophilicity and anticorrosion on the fin surface.

For example, U.S. Pat. No. 4,973,359, entitled "SURFACE TREATMENT CHEMICAL AND BATH FOR FORMING HYDROPHILIC COATINGS AND METHOD OF SURFACE-TREATING ALUMINUM MEMBERS", discloses a hydrophilic surface-treating chemical and so on which contain predetermined amounts of sodium salt and/or potassium salt of carboxymethyl cellulose, ammonium salt of carboxymethyl cellulose, and N-methylol acrylamide.

Further, U.S. Pat. No. 5,096,958, entitled "HYDROPHILIC SURFACE TREATMENT CHEMICALS, HYDROPHILIC SURFACE TREATMENT BATH, AND HYDROPHILIC SURFACE TREATMENT METHOD", discloses hydrophilic surface-treating chemicals and so on which contain predetermined amounts of polyvinyl acetate having predetermined degrees of polymerization and saponification, aqueous soluble nylon, and water base amino resin, the composition ratio of each components being specified.

These chemicals, bath, and method for hydrophilic surface-treatment enable the forming of a film superior in anticorrosion, hydrophilicity, low solubility in aqueous media, and processing without giving off a bad smell. However, they can't maintain initial hydrophilicity because the film is dissolved in water as time passes. In other words, when using a heat exchanger fin for a long time on which a conventional hydrophilic surface-treatment is provided, the hydrophilic surface-treating chemicals are dissolved or corroded by water, or the power (efficiency) of the hydrophilic surface-treating chemical itself is degraded as time goes, which results in degradation of the hydrophilicity of the fin surface.

In order to solve this problem, it has been tried to add a hardening agent (or hardening resin) to maintain the hydrophilicity, but a high level of permanency have not been achieved.

SUMMARY OF THE INVENTION

This invention was conceived in view of the above problems. It is an objective of the invention to provide an aqueous solution and a method for providing a hydrophilic surface-treatment to form a film superior in levels of hydrophilic permanency.

According to an aspect of the invention, there is provided a hydrophilic surface-treating aqueous solution containing as its main components (i) polyglutamic acid and (ii) a basic compound.

In an another aspect of the invention, there is provided a hydrophilic surface-treating solution containing as its main components (i) polyglutamic acid, (ii) a basic compound, and (iii) an aqueous resin.

In the above hydrophilic surface-treating solution, said aqueous resin may be selected from the group (a) unsaturated polymerizeable monomer or unsaturated polymerizeable aqueous high molecular compound containing carboxyl group and/or hydroxyl group and/or amide group; (b) high molecular natural compound including carboxyl group and/or hydroxyl group, and its derivatives; (c) aqueous alkyd resin; (d) aqueous maleic oil; (e) aqueous polyester resin; (f) aqueous polybutadiene resin; (g) aqueous polyamide resin; (h) aqueous epoxy resin; (i) aqueous polyurethane resin; (j) aqueous phenolic resin; (k) aqueous amino resin; and (1) aqueous inorganic cross-linking agent.

It is another objective of the invention to provide a hydrophilic surface-treating method comprising the steps of: degreasing a material to be treated made of aluminum or aluminum alloy; subjecting the material to anticorrosion treatment if necessary; and treating the material by use of a hydrophilic surface-treating aqueous solution containing as its main components polyglutamic acid, basic compound and aqueous resin, if necessary.

According to a further aspect of the invention, there is the measure to provide a hydrophilic surface-treating film containing polyglutamic acid. By providing this film onto the aluminum or aluminum alloy used for, for example, the fins of a heat exchanger, hydrophilic aluminum material can be obtained.

The above-described hydrophilic surface-treating aqueous solution is used as a surface-treating liquid or bath for aluminum and its alloy, which is obtained by diluting a thick and dense hydrophilic surface-treatment solution with a proper amount of water to a concentration within a usable range (1 to 50 wt %, preferably 2 to 20 wt %).

The polyglutamic acid (PGA) used for this hydrophilic surface-treating solution can be γ-PGA and α-PGA (γ-PGA is more preferable), where constitutional formula are shown below. γ-PGA is created by microorganism (bacteria), and α-PGA is produced by chemical synthesis. The synthesizing method is not specified here.

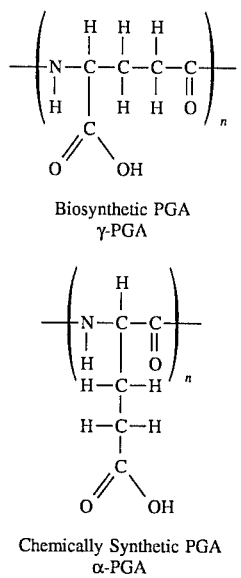

Biosynthetic PGA
γ-PGA

Chemically Synthetic PGA
α-PGA

The polyglutamic acid has a weight-average molecular weight (Mw) of 10,000 to 2,000,000, preferably of 100,000 to 1,500,000. The molecular weight was measured by Gel Permeation Chromatography (GPC). When the weight-average molecular weight of the polyglutamic acid is less than 10,000, a hydrophilic film can not be formed perfectly, while when the weight average molecular weight is more than 2,000,000, treating efficiency is reduced due to the increase of viscosity of the hydrophilic surface-treating aqueous solution.

Since the basic structure of γ-PGA and α-PGA is $C_5H_7NO_3$ (the structures are shown at page 5 of the specification), the molecular weight thereof is 129. The weight average molecular weight of polyglutamic acid in accordance with the present invention is 10,000–2,000,000 (specification page 6, line 1). Therefore, the following totals result.

10,000÷129=77.5

2,000,000÷129=15503.8

However, the actual molecular weight of the N-terminal of PGA is 146 on the basis of HOOCCH$_2$CH$_2$CH(NH)COOH, and the molecular weight of the C-terminal of PGA is 130 on the basis of —OCCH$_2$CH$_2$CH(NH$_2$)COOH. The molecular weight of glutamic acid is 147 based on the formula HOOCCH$_2$CH$_2$CH(NH$_2$)COOH. Accordingly, the following results are obtained.

(10,000−146−130)÷129+2=77.3

(2,000,000−146−130)÷129+2=15503.7 where, "+2" represents the N-terminal of PGA plus the C-terminal of PGA. Usually the general formula of a high molecular weight compound is represented using a repetition number "n" in the basic structure thereof, with the structures of both ends of the compound being apparent to one skilled in the art.

The refined γ-PGC is obtained by culturing *Bacillus subtilis* F-2-01 strain and processing the culture solution by the following steps: adding methanol to the culture solution; stirring and filtrating the methanol-added culture solution until obtaining a clear and thick filtrate; adjusting pH in the filtrate with a thick sulfuric acid; desalting the adjusted filtrate by an ion-exchange resin; centrifuging the precipitate which has deposited in the desalted solution; washing the cake obtained by centrifugation with methanol; and drying the cake under reduced pressure. Since γ-PGA is commercially available, any such γ-PGA on the market can be used for the hydrophilic surface-treating solution.

It is preferable that the basic compound, as another main component of the hydrophilic surface-treating aqueous solution, is an aqueous compound having a boiling point under 200° C. Such aqueous compound may be ammonia, or amine such as allylamine, isopropylamine, ethylamine and ethylene diamine.

The aqueous resin for use in the hydrophilic surface-treating solution is an aqueous resin in a wide sense, which may include a water-dispersible resin, water-soluble resin water-soluble hardening agent or resin to be added for the purpose of hardening, and a water-dispersible hardening agent or resin to be added for the purpose of hardening.

The aqueous resin may include, for example, the following.

(a) Unsaturated polymerizeable monomer or unsaturated polymerizeable aqueous high molecular compound containing carboxyl group and/or hydroxyl group and/or amide group, such as poly(metha)acrylic acid, (metha)acrylic acid, (metha)acrylic acid ester copolymer, styrene-metha(acrylic) copolymer, polyvinyl alcohol obtained by partial saponification of polyvinyl acetate resin, polyvinyl pyrrolidone, a polymer of derivatives of (metha)acrylamide such as N-methylol(metha)acrylamide. Among these, poly(metha)acrylic acid, (metha)acrylic acid and (metha)acrylic acid ester copolymer contribute to increase anti-alkalinization and anti-corrosion. Polyvinyl alcohol obtained by partial saponification of polyvinyl acetate resin exhibits a function of conferring odor-proof properties and hydrophilicity. Polyvinyl pyrrolidone exhibits a function of improving the persistency of hydrophilicity to some extent. N-methylol-(metha)acrylamide contributes to the increase in adhesion of the hydrophilic film as well as improvement of the water-proof properties. As long as the effect of the present invention is not impaired, there may be added polyvinyl acetate resin, polyvinyl chloride resin, vinyl chloride-vinyl acetate copolymer, polymer of (metha)acrylamide, and so on.

(b) High molecular natural compound containing carboxyl group and/or hydroxyl group and its derivatives. These include cellulose derivatives or methyl cellulose derivatives such as carboxymethyl cellulose (CMC), hydroxyethyl cellulose (HEC), hydroxypropyl cellulose (HPC), methyl cellulose (MC), ethyl cellulose (EC), ethylhydroxyethyl cellulose (EHEC), tannic acid, lignin sulfonic acid, alginic acid, and hyaluronic acid etc. Gum or polysaccharide derivatives are also available.

(c) Aqueous alkyd resin which is obtained by condensing (i) a polyol such as glycerin, pentaerythritol, ethylene glycol and trimethylol ethane, and (ii) a higher fatty acid derived from fat and fatty oil, for example, such as a dibasic acid or anhydride including palmitic acid, phthalic anhydride, and maleic anhydride.

(e) Aqueous polyester resin which may be obtained by half-esterifying the hydroxyl group in polyester resin with trimellitic anhydride, and neutralizing a residual carboxylic acid group with amine so as to confer aqueous properties thereon. Also available is one obtained by reacting polyethylene glycol with polybasic acid so as to confer aqueous properties on the polyester resin.

(f) Aqueous polybutadiene resin which may be one obtained by polymerizing butadiene with a catalyst. There are 1, 2-bonding type and 1, 4-bonding type of polybutadiene which can be alternatively used. Their film can be formed by heat, peroxide, or sulfur.

(g) Aqueous polyamide resin obtained by:

(1) ring opening polymerization of ε-caprolactam;

(2) condensation polymerization of hexamethylenediamine and adipic acid;

(3) condensation polymerization of hexamethylenediamine and sebacic acid;

(4) condensation polymerization of 11-aminoundecanoic acid; and (5) ring opening polymerization of ω-laulolactam, or condensation polymerization of 12-aminododecanoic acid.

The above may be dissolved in water. For example, water soluble nylon which is soluble in water or in water and alcohol is available preferably.

(h) Aqueous epoxy resin including water-soluble epoxy resin and water dispersible epoxy resin. Water soluble epoxy resin can be diglycidyl ether or polyglycidyl ether of aliphatic polyhydric alcohol, dicarboxylic acid diglycidyl ester, epoxy compound containing nitrogen heterocycle. One water dispersible epoxy resin can be obtained by adding proper emulsifier to water or a liquid mixture of water and organic solvent to dispersion emulsify the epoxy resin, and one obtained by denaturalizing the epoxy resin to be dissolved in water or to be dispersion emulsified. More specifically, it can be obtained by introducing a hydrophilic group into epoxy resin, or by introducing an anionic group such as a carboxyl group or cationic group such as an amino group into an epoxy group and neutralizing it with a hydroxyl group or acid to confer aqueous properties so as to be a polyelectrolyte.

(i) Aqueous polyurethane resin, which may be one obtained by introducing an anionic group or cationic group into molecules to confer aqueous properties thereon. Alternately, it may be obtained by adding bisulfite to urethane polymer whose distal group is an isocyanate group so as to block the isocyanate group, and conferring aqueous properties thereon due to hydrophilicity of sulphonate. Also available is one obtained by blocking polyurethane prepolymer with a blocking agent, and then compulsorily dispersion emulsifying it.

(j) Aqueous phenolic resin which may be obtained by adding aldehyde such as formalin or furfural to materials having a phenolic-OH group such as phenol, xylenol, p-alkylphenol, p-phenylphenol, chlorophenol, bisphenol A, phenolsulphonic acid, and resorcin, to confer aqueous properties on the thus condensed high molecular compound. These are generally categorized as phenol/formalin resin, cresol/formalin resin, phenol/furfural resin, resorcin resin, etc. The aqueous phenolic resin forms a network between resins and functions to improve the film-forming properties.

(k) Aqueous amino resin, which can be, for example, water solubilized melamine resin, such as n-butylated melamine resin and isobutylated melamine resin, or urea resin. These resins are ordinarily obtained by adding aldehyde such as formaldehyde, paraformaldehyde, etc., to amino compounds such as melamine and benzoguanamine to cause reaction or condensation, and by etherifying the product with monohydric alcohol having 1 to 4 carbon atoms. The amino resin forms a network between resins and functions to improve the film forming properties. A specific example of the melamine resin can be alkoxymethylmelamine resin whose alkoxyl group is methoxy, ethoxy, n-butoxy, i-butoxy.

(1) Aqueous inorganic cross-linking agent which is a metallic compound capable of forming a complex compound with aqueous polymer or copolymer, and, in particular, can be compounds of Cr (Chromium), Ti (Titanium), Al (Aluminum), Zn (Zinc), Zr (Zirconium), etc.

As an aqueous compound containing 10% or more of polyoxyalkylene chain in terms of solid content and having 10,000 to 2,000,000 of weight-average molecular weight, there can be polyethylene oxide, ethylene oxide/propyleneoxide copolymer, ethylene oxide/methylene oxide copolymer, and their end-methylated compounds. These compounds may also be used along with the above listed (a) to (k) aqueous resins.

In the case that the hydrophilic surface-treating solution contains polyglutamic acid and basic compound as its main components, the composition ratio is set so that the amount of added basic compound is capable of substantially dissolving the polyglutamic acid of the hydrophilic surface-treating agent in water, which can neutralize 10 to 200% of, more preferably 50 to 120% of, carboxyl group of PGA.

In the case that the hydrophilic surface-treating solution contains polyglutamic acid, basic compound and aqueous resin as its main components, the amount ratio of aqueous resin to the sum of polyglutamic acid and basic compound (i.e. aqueous resin/(PGA+basic compound)) is preferably 100/2,000 to 100/5, more preferably, 100/1,000 to 100/5. When the above ratio (aqueous resin/PGA+basic compound) is under 100/2,000, the effect of added aqueous resin is impaired to some extent.

Tables 1 and 2 depict preferred examples of compositions of a hydrophilic surface-treating aqueous solution containing polyglutamic acid, basic compound and aqueous resin.

TABLE 1

Examples of Composition for Hydrophilic Surface-Treating Aqueous Solution Consisting of Polyglutamic Acid and Basic compound and Aqueous resin Ratio of solids of content

| Composition No. | Poly-glutamic Acid (PGA) | 28%- *1 ammonia water | Aqueous Resin | | | | | | | Others | |
| --- | --- | --- | --- | --- | --- | --- | --- | --- | --- | --- | --- |
| | | | PAA | PVA | PVP | CMC | HEC | W, B-R | $H_2ZrF_6$ | Acrylic monomer | PEO |
| 1 | 100 | (26-57) | — | — | — | — | — | — | — | — | — |
| 2 | 10-90 | (30-80) | 10-90 | — | — | — | — | — | — | — | — |
| 3 | 5-90 | (1.3-51) | — | 10-95 | — | — | — | — | — | — | — |
| 4 | 5-90 | (1.3-51) | — | — | 10-95 | — | — | — | — | — | — |
| 5 | 5-90 | (1.3-51) | — | — | — | 10-95 | — | — | — | — | — |
| 6 | 5-90 | (1.3-51) | — | — | — | — | 10-95 | — | — | — | — |
| 7 | 10-95 | (2.8-55) | — | — | — | — | — | 5-90 | — | — | — |
| 8 | 30-90 | (8-51) | — | — | — | — | — | — | — | 10-70 | — |
| 9 | 5-90 | (8-51) | — | — | — | — | — | — | — | 5-70 | 5-70 |
| 10 | 5-83 | (8-48) | — | — | — | 5-83 | — | — | 2-20 | 5-70 | 5-70 |

Note) PAA: Polyacrylic acid, W, B-R: Polyamide resin, Urethane resin, Epoxy resin, Phenolic resin, Melamine resin, Urea resin
PVA: Polyvinyl alcohol, Acrylic monomer: N-methylol acrylamide,
PVP: Polyvinyl pyrrolidone, PEO: Polyethylene oxide,
CMC: Carboxymethyl cellulose,
HEC: Hydroxyethyl cellulose
*1 Ammonia water which is represented in weight percentage is not included in solids content since it volatilizes during the baking process.

TABLE 2

Examples of Composition for Hydrophilic Surface-Treating Aqueous Solution Consisting of Polyglutamic Acid and Basic compound and Aqueous resin Ratio of solids of content

| Composition No. | Poly-glutamic Acid (PGA) | 28%- *1 ammonia water | Aqueous Resin | | | | | | | Others | |
| --- | --- | --- | --- | --- | --- | --- | --- | --- | --- | --- | --- |
| | | | PAA | PVA | PVP | CMC | HEC | W, B-R | $H_2ZrF_6$ | Acrylic monomer | PEO |
| 11 | 5-81 | (3-112) | 2-78 | — | — | 5-81 | — | — | 2-20 | 5-70 | 5-81 |
| 12 | 5-78 | (1.3-45) | — | — | 5-78 | 5-78 | — | — | 2-20 | 5-70 | 5-78 |
| 13 | 5-81 | (3-112) | 2-78 | 5-81 | — | — | — | — | 2-20 | 5-70 | 5-81 |
| 14 | 5-81 | (3-112) | 2-78 | — | 5-81 | — | — | — | 2-20 | 5-70 | 5-81 |
| 15 | 5-81 | (3-112) | 2-78 | — | — | — | 5-81 | — | 2-20 | 5-70 | 5-81 |
| 16 | 5-81 | (3-112) | 2-78 | — | — | — | — | 5-81 | 2-20 | 5-70 | 5-81 |
| 17 | 5-8 | (3-122) | 2-85 | — | — | — | — | 5-88 | — | — | 5-88 |
| 18 | 5-83 | (3-115) | 2-80 | 5-83 | — | — | — | — | — | 5-70 | 5-83 |

Note) PAA: Polyacrylic acid, W, B-R: Polyamide resin, Urethane resin, Epoxy resin, Phenolic resin, Melamine resin, Urea resin
PVA: Polyvinyl alcohol, Acrylic monomer: N-methylol acrylamide,
PVP: Polyvinyl pyrrolidone, PEO: Polyethylene oxide,
CMC: Carboxymethyl cellulose,
HEC: Hydroxyethyl cellulose
*1 Ammonia water which is represented in weight percentage is not included in solids content since it volatilizes during the baking process.

The hydrophilic surface-treating aqueous solution of the present invention is intended to be coated on anticorrosive pre-treated aluminum or aluminum alloy in accordance with the method described below. The coated aluminum material is dried at about 200° C. to volatilize the basic compound. A hydrophilic surface-treating film containing polyglutamic acid is thus obtained.

In the treating method of this invention, a plate of aluminum or aluminum alloy is first degreased. Then, if necessary, chemical conversion treatment is carried out as an anticorrosive pretreatment. Degreasing treatment may be done by solvent degreasing using trichloroethylene perchloroethylene, gasoline, normal hexane, etc., or alkali degreasing using alkaline solution such as sodium hydroxide, sodium carbonate, sodium silicate, sodium phosphate, etc.

The chemical conversion treatment may include phosphoric chromating, coating-type chromating, phenol or urethane series of resin primer treatment, and non-chromating.

The phosphoric chromating treatment is performed by uses of treating liquid obtained by adding additives to chromic anhydride and phosphoric acid. This treatment may be done by immersing the degreased plate into treating liquid or spraying the treating liquid onto the plate, but is preferably performed by immersion method due to the complicated configuration of the fins of a heat exchanger. The anticorrosion film obtained by phosphoric chromating treatment is 3 to 50 mg/m² in the amount of chromium (Cr). When the anticorrosion film is less than 3 mg/m², the anticorrosive properties are poor, whereas if it is over 50 mg/m² a reaction with the hydrophilic film will occur, and as a result, the hydrophilicity is reduced. The aluminum or aluminum alloy on which anticorrosion film has been formed is washed by water. It is preferable that the water washing at this step be carried out for about 10 to 30 seconds.

The coating-type of chromating treatment is a chromating treatment agent using coating means such as a roll coater. In this case, the amount of chromium in the film is preferably 5 to 30 mg/m$^2$.

The non-chromating treatment is performed by using a treating agent containing no chromate such as, for example, zirconium treating agent which may be a mixture of polyacrylic acid and zirconium fluoride. The amount of Zr contained in this film is 0.1 to 40 mg/m$^2$. Like the Cr amount, when the Zr amount is less than 0.1 mg/m$^2$ the anticorrosion properties are poor, whereas if over 40 mg/m$^2$ the hydrophilicity is inversely lowered. A further effect will be obtained by superposing the zirconium treatment over the chromating treatment.

A phenol series or urethane series of resin primer treatment, which confers even superior anticorrosion properties, preferably uses an aqueous resol-type phenolic resin (which is an initial polymer of phenol and formalin in the presence of the alkali catalyst). The phenol series resin primer may contain melamine resin besides the phenol resin. Preferred melamine resin is an aqueous melamine resin which has been methylated, ethylated, and/or butylated, whose content is 50 wt % or less with respect to 50 to 100 wt % of phenolic resin. Alternately, an acryl series resin may be mixed therein for improving the bending processability or coating workability. After coating the phenol series resin primer, the plate is baked at the temperature of 180° to 280° C. for 10 to 60 seconds. The coating film is preferably within the range of 0.5 to 2.0 g/m$^2$. When the coating film is less than 0.5 g/m$^2$ the anticorrosion properties become poor, whereas if over 2.0 g/m$^2$ the efficiency of heat exchange is lowered, resulting in raised cost.

Typical pretreatment is carried out by combining degreasing treatment with either of the chemical conversion treatments depending on necessity.

The hydrophilic surface-treating method comprises a step of coating a hydrophilic surface-treating aqueous solution of this invention onto the pre-treated aluminum or aluminum alloy. Coating method may include a roll-coat method, bar-coat method, immersion method, spray method, and paint-brush method, which are applied as either precoating or postcoating. When employing, for example, the roll-coat method, a hydrophilic film can be obtained by drying at a temperature of 150° to 270° C. for 10 to 60 seconds after coating. When the baking temperature in this case is less than 150° C., no film is formed, whereas if the temperature is over 270° C., the persistency of hydrophilicity is insufficient. The thickness of the hydrophilic surface-treating film is preferably over 0.05 g/m$^2$, and more preferably, lies within the range of 0.1 to 2.0 g/m$^2$. When the film thickness is less than 0.05 g/m$^2$, the consistency of hydrophilicity is insufficient.

A proper amount of additives may be added to the hydrophilic surface-treating aqueous solution or film of the present invention in accordance with the function to be conferred thereon. For example, lubricant may be added to confer lubricity and processability, which may include ethylene glycol or polyethylene glycol.

In order to improve the workability, such as stability, foaming properties and coating properties, of the treating liquid, a surfactant may be added. The surfactant may be selected from among the group consisting of nonionic, anionic, cationic, and amphoteric surfactants according to the desired function. Used as the nonionic surfactant herein are, for example, polyoxyethylene glycol, polyoxyethylene polyoxypropylene glycol, polyoxypropylene glycol, polyoxyethylene alkylphenylether, glycerin fatty acid partial ester, sorbitan fatty acid partial ester, pentaerythritol fatty acid partial ester, and polyoxyethylene alkylether.

Used as the anionic surfactant are, for example, dialkylsulfosuccinate, alkaline sulfonate, alkylbenzene sulfonate, alkylnaphthalene sulfonate, polyoxyethylene alkylsulphophenylether salt, alkylphosphoric ester salt, polyoxyethylene alkylethylphosphoric ester salt, sulfuric ester salt of fatty acid alkylester, alkylsulfuric ester salt, polyoxyethylene alkylether sulfuric ester salt, and fatty acid monoglyceride sulfuric ester salt.

As the cationic surfactant, there can be used alkylamine salt and dialkylamine salt. As the amphoteric surfactant used is, for example, N,N,N-trialkyl-N-surfoalkyleneammoniumbetaine.

In the case of effecting coloring, pigment and/or dye may be added. The pigment can be either an inorganic pigment or organic pigment. The inorganic pigment can be, for example, natural pigment such as yellow ocher; chromate such as chrome yellow, zinc yellow and barium yellow; ferrocyanide such as Prussian blue; oxide such as titanium white, red iron oxide, zinc white, iron black, etc.; sulfide such as cadmium yellow, cadmium red, etc.; sulfate such as barium sulfate; silicate such as calcium silicate, ultramarine, etc.; metallic powder such as bronze powder, aluminum powder, etc.; and others such as chrome green, etc. The natural pigment can be, for example, natural dye lake such as madder lake; nitroso pigment such as naphthol green; azo pigment such as CURMINE 6B, WATCHYOUNGRED, pyrazolone red, BENCHDIN YELLOW, hansa yellow, etc; basic dye lake such as Rhodamine lake, Malachite green lake, etc.; mordant dye pigment such as alizarin lake; phthalocyanine pigment such as phthalocyaine blue, phthalocyanine green, etc; other fluorescent pigment; and azine pigment (diamond black). The dye may be aqueous dye or oil dye. The aqueous dye may include basic dye such as Rhodamine B, acid dye such as orange II, and other fluorescent dyes. The oil dye can be, for example, monoazo dye such as Fast orange R, oil orange, oil yellow, etc.; ANTHRAKYNON dye such as ANTHRAKYNON BLUE and ANTHRAKYNON VIOLET; azine dye such as nigrosine and INJURINE; and other basic, acid, metal complex compound dyes.

In the case of conferring fungus resistance or bacteria resistance, fungistat or antiseptic may be added therein. The fungistat/antiseptic may include quaternary ammonium salt, nitride-containing sulfur compound, halogen-containing nitrogen sulfide, organic iodine compound, benzimidazole compound, etc. The fungistat can be, for example, 2-thiazole-4-yl-benzimidazole, methylbenzimidazole-2-yl-carbamate, N-dichlorofluoromethylthio-N'-N'-dimethyl-N-phenylsulfamide, tetramethylthiuram disulfide, N-(trichloromethylthio)-4-cyclohexane-1,2-dicarboxyimide, 2,4,5,6-tetrachloro-1,3-isophthalonitrile, 2,3,5,6-tetrachloro-4-(methylsulfonyl)pyridine, bis(2-pyridylthio)-zinc-1, and 1-dioxide. In view of the heat resistance, preferable are 2-thiazole-4-yl-benzimidazole, methylbenzimidazole-2-yl-carbamate, 2,3,5,6-tetrachloro-1,3isophthalonitrile, bis(2-pyridylthio)-zinc-1, and 1-dioxide. The bacteria resistance agent can be, for example, 1,2-benzisothiazoline-3-one(BIT), 2,3,5,6-tetrachloro-4-(methylsulphonyl)pyridine, and 10,10'-oxybisphenoxyarsine.

According to the experiments of this invention, polyglutamic acid (PGA) is a resin having superior hydrophilicity, and once being coated, it is not dissolved or washed off by water under normal conditions. Thus, the hydrophilic surface-treating film containing PGA can maintain its hydrophilicity after being coated. Meanwhile, polyglutamic acid is dissolved in a solution containing basic compound, which allows uniform coating on the aluminum or aluminum alloy. Furthermore, since the basic compound is volatile, this component is evaporated by the baking process carried out after coating, and non-soluble hydrophilic film containing PGA is solely left on the surface of the aluminum alloy.

DESCRIPTION OF PREFERRED EMBODIMENT

The present invention will now be specifically described with reference to actual examples and comparison examples.

It will be noted that the following performance evaluation tests for hydrophilic surface-treating method and film were performed under the common conditions through the embodiments (actual examples) and the comparison examples.

Hydrophilic Surface-Treating Method

An aluminum plate was degreased and then chemically converted as necessary. Hydrophilic surface-treating aqueous solutions having compositions shown in Tables 3 to 9 and 11 (for the embodiments and comparison examples) were prepared. These solutions were diluted by water to be regulated to appropriate concentrations according to the workability, then applied to the plate by a bar coater #4, and dried for 20 seconds at 200° C. to form a hydrophilic film (dry film 0.1 to 1 g/m²) The thus obtained film was subjected to the following tests.

Performance Evaluation Test (1) Water Contact Angle Measurement Test:

A sample of aluminum plate which had undergone the above treatment was subjected to flow water for 8 hours and then dried at 80° C. for 16 hours, which constituted a cycle (i.e. warming cycle). After 20 cycles of repetitions, the contact angle of water droplet with respect to the dried hydrophilic film was measured. This test is intended to evaluate the persistency of hydrophilicity, and the smaller the contact angle is, the better the hydrophilic permanency becomes.

<Measurement Method>

The aluminum plate sample which had been subjected to the warming cycles was laid horizontally, on which 5 μl of pure water was dropped. The contact angle of waterdrops was measured by use of a FACE goniometer Model CA-Z manufactured by KYOWA KAIMEN KAGAKU K.K. at the room temperature. This measurement was conducted 30 seconds after the dropping.

(2) Film Formability Test

The aluminum plates, which had been subjected to warming cycles and contact angle measurement tests, were then visually observed to evaluate the film formability.

<Evaluation Standards> excellent: The film is completely intact.

good: The film is substantially intact.

fair: The film is intact 50% or more.

poor: The film is not intact at all.

It should be noted that the following chemical agents were used as a phosphoric chromating treatment, coating-type of chromating treatment, and phenol series resin primer for the substrate treatment (including degreasing and chemical conversion).

ALSURF 407/47 manufactured by Nippon Paint Co., Ltd. ("ALSURF" is a registered trademark of Nippon Paint Co., Ltd.) was used as a phosphoric chromating treatment so that the film amount (measured as Cr amount) would be 20 mg/m². As a coating-type chromating treatment, SURFALCOAT 427 (Nippon Paint, registered trademark) was used so that the film amount (Cr amount) would be 20 mg/m². As a zirconium treating agent, SURFALCOAT 430A/430B (Nippon Paint) was used so that the Zr amount would be 5 mg/m². SURFALCOAT 450 (Nippon Paint) was used as a phenol series resin primer so that the film amount was 500 mg/m².

The surface-treating solutions, whose compositions are shown in Tables 3 to 9 and 11, were applied over the undercoating described above. The thus formed hydrophilic surface-treating films were evaluated, which results are shown in Tables 3 to 7 and 11.

ACTUAL EXAMPLES 1 to 3

Table 3 shows the result of performance evaluation of examples 1 to 3 according to the present invention with variation in magnitude of molecular weight of γ-PGA.

TABLE 3

| Actual example | Substrate treatment | Composition(Part by weight) γ-PGA | | | 28%- ammonia water | Film- formability | *1 Water-drop contact angle(°) |
|---|---|---|---|---|---|---|---|
| | | Mw:300,000 | Mw:5,000 | Mw:1,000,000 | | | |
| 1 | Phosphoric chromating | 10 | — | — | 5 | excellent | 20 |
| 2 | Phosphoric chromating | — | 10 | — | 5 | good | 38 |
| 3 | Phosphoric chromating | — | — | 10 | 5 | excellent | 22 |

Note) Mw: Weight-average molecular weight
*1 Water-drop contact angle: Parameter of permanency of hydrophilicity (The smaller the contact angle, the better the permanency of hydrophilicity)

ACTUAL EXAMPLES 4 to 7

Table 4 shows the result of performance evaluation of examples 4 to 7 depending on the difference between α-type and γ-type of PGA.

TABLE 4

| Actual example | Substrate treatment | γ-PGA Mw:300,000 | γ-PGA Mw:5,000 | γ-PGA Mw:1,000,000 | α-PGA Mw:5,000 | 28%-ammonia water | Aqueous resin Carboxymethyl cellulose | Film-formability | *1 Water-drop contact angle(°) |
|---|---|---|---|---|---|---|---|---|---|
| 4 | Phosphoric chromating | 1 | — | — | — | 0.5 | 9 | excellent | 24 |
| 5 | Phosphoric chromating | — | 1 | — | — | 0.5 | 9 | good | 28 |
| 6 | Phosphoric chromating | — | — | 1 | — | 0.5 | 9 | excellent | 25 |
| 7 | Phosphoric chromating | — | — | — | 1 | 0.5 | 9 | good | 30 |

Note) Mw: Weight-average molecular weight
*1 Water-drop contact angle: Parameter of permanency of hydrophilicity (The smaller the contact angle, the better the permanency of hydrophilicity)

ACTUAL EXAMPLES 8 TO 15 AND COMPARISON EXAMPLES 1 TO 8

Table 5 shows the comparison between the hydrophilic surface-treating solution of this invention (Examples 8 to 15) which contains polyglutamic acid, basic compound and aqueous resin as main components, and the conventional surface-treating solution (Comparison Examples 1 to 8) containing only basic compound and aqueous resin without polyglutamic acid. In this test, especially high water-soluble aqueous resin was used.

TABLE 5

| | Substrate treatment | γ-PGA Mw: 300,000 | 28%-ammonia water | PAA | PVA | PVP | CMC | HEC | Poly-amide | Urethane resin | Epoxy resin | Film-formability | *1 Water-drop contact angle(°) |
|---|---|---|---|---|---|---|---|---|---|---|---|---|---|
| Actual examples | | | | | | | | | | | | | |
| 8 | Phosphoric chromating | 8 | 4 | 2 | — | — | — | — | — | — | — | excellent | 22 |
| 9 | Phosphoric chromating | 8 | 4 | — | 4 | — | — | — | — | — | — | excellent | 39 |
| 10 | Phosphoric chromating | 8 | 4 | — | — | 4 | — | — | — | — | — | excellent | 38 |
| 11 | Phosphoric chromating | 1 | 0.5 | — | — | — | 9 | — | — | — | — | excellent | 24 |
| 12 | Phosphoric chromating | 1 | 0.5 | — | — | — | — | 9 | — | — | — | excellent | 25 |
| 13 | Phosphoric chromating | 8 | 4 | — | — | — | — | — | 2 | — | — | excellent | 17 |
| 14 | Phosphoric chromating | 9 | 4.5 | — | — | — | — | — | — | 1 | — | excellent | 42 |
| 15 | Phosphoric chromating | 9 | 4.5 | — | — | — | — | — | — | — | 1 | excellent | 48 |
| Comparison examples | | | | | | | | | | | | | |
| 1 | Phosphoric chromating | — | 1.5 | 3 | — | — | — | — | — | — | — | poor | — |
| 2 | Phosphoric chromating | — | — | — | 10 | — | — | — | — | — | — | fair | 47 |
| 3 | Phosphoric chromating | — | — | — | — | 10 | — | — | — | — | — | fair | 45 |
| 4 | Phosphoric chromating | — | — | — | — | — | 10 | — | — | — | — | fair | 29 |
| 5 | Phosphoric chromating | — | — | — | — | — | — | 10 | — | — | — | fair | 28 |
| 6 | Phosphoric | — | — | — | — | — | — | — | 10 | — | — | poor | — |

TABLE 5-continued

| | Substrate treatment | Composition(Part by weight) | | | | | | | | | | Water-drop contact angle(°) *¹ |
|---|---|---|---|---|---|---|---|---|---|---|---|---|
| | | γ-PGA Mw: 300,000 | 28%- ammonia water | Aqueous resin*² | | | | | | | Film-formability | |
| | | | | PAA | PVA | PVP | CMC | HEC | Poly-amide | Urethane resin | Epoxy resin | | |
| 7 | chromating Phosphoric chromating | — | — | — | — | — | — | — | — | 10 | — | excellent | 58 |
| 8 | Phosphoric chromating | — | — | — | — | — | — | — | — | — | 10 | excellent | 67 |

Note) Mw: Weight-average molecular weight
*¹Water-drop contact angle: Parameter of permanency of hydrophilicity (The smaller the contact angle, the better the permanency of hydrophilicity)
*²PAA: Polyacrylic acid(Mw:1,000,000), PVP: Polyvinyl pyrrolidone (Mw:20.000), Polyamide: AQ NYLOL P ~ 70 (manufactured by TORAY IND. INC), CMC: Carboxymethyl cellulose (Mw:20,000), Urethane resin: ADEKA BONLITER HUX-232 (manufactured by ASAHI DENKA KOGYO K.K.), PVA: Polyvinyl alcohol (Mw:20,000), HEC: Hydroxyethyl cellulose(Mw;20.000), Epoxy resin: EPOLSION EA55 (manufactured by KANEBO NSC K.K.)

ACTUAL EXAMPLES 16 TO 20 AND COMPARISON EXAMPLES 9 TO 12

Table 6 shows the comparison between the hydrophilic surface-treating solution of this invention (Examples 16 to 20) which contains polyglutamic acid, basic compound and aqueous resin as main components, and the surface-treating solution (Comparison Examples 9 to 12) consisting of aqueous resin without containing polyglutamic acid and basic compound. In this test, the aqueous resin is one used as a typical hardening agent.

ACTUAL EXAMPLES 21 TO 23 AND COMPARISON EXAMPLES 13 TO 15

Table 7 shows the comparison between the hydrophilic surface-treating solution of this invention (Examples 21 to 23), which contains polyglutamic acid, basic compound and aqueous resin as main components and is further added to with another aqueous resin used as a hardening agent, and the surface-treating solution (Comparison Examples 13 to 15) consisting of aqueous resin without containing polyglutamic acid and basic compound and another aqueous resin used as a hardening agent. In this test, the substrate treatment is degreasing.

TABLE 6

| | Substrate treatment | Composition(Part by weight) | | | | | | | | Water-drop contact angle(°) *¹ |
|---|---|---|---|---|---|---|---|---|---|---|
| | | γ-PGA Mw:300,000 | 28%- ammonia water | Aqueous resin*² | | | | | Film-formability | |
| | | | | Phenolic resin | Melamine resin | Urea resin | $H_2ZrF_6$ | Acrylic monomer | | |
| Actual examples | | | | | | | | | | |
| 16 | Phosphoric chromating | 9 | 4.5 | 1 | — | — | — | — | excellent | 22 |
| 17 | Phosphoric chromating | 9 | 4.5 | — | 1 | — | — | — | excellent | 52 |
| 18 | Phosphoric chromating | 9 | 4.5 | — | — | 1 | — | — | excellent | 29 |
| 19 | Phosphoric chromating | 9 | 4.5 | — | — | — | 1 | — | excellent | 20 |
| 20 | Phosphoric chromating | 8 | 4 | — | — | — | — | 2 | excellent | 21 |
| Comparison examples | | | | | | | | | | |
| 9 | Phosphoric chromating | — | — | 10 | — | — | — | — | excellent | 54 |
| 10 | Phosphoric chromating | — | — | — | 10 | — | — | — | excellent | 67 |
| 11 | Phosphoric chromating | — | — | — | — | 10 | — | — | excellent | 49 |
| 12 | Phosphoric chromating | — | — | — | — | — | 10 | — | excellent | 44 |

Note) Mw: Weight-average molecular weight
*¹Water-drop contact angle: Parameter of permanency of hydrophilicity (The smaller the contact angle, the better the permanency of hydrophilicity)
*²Phenolic resin: RESITOP PL2761(manufactured by GUNEI CHEMICAL IND. Co., Ltd), Melamine resin: NIKALAC MW-22 (manufactured by SANWA CHEMIKAL Co., Ltd), Urea resin: UFR-65 (manufactured by MISTUI TOATSU CHEMICAL INC.), Acrylic monomer: N-methylol acrylamide

TABLE 7

| | Substrate treatment | γ-PGA Mw:300,000 | 28%-ammonia water | Composition(Part by weight) Aqueous resin*2 | | | | Others PEO | Film-formability | *1 Water-drop contact angle(°) |
|---|---|---|---|---|---|---|---|---|---|---|
| | | | | PAA | CMC | $H_2ZrF_6$ | Acrylic monomer | | | |
| Actual examples | | | | | | | | | | |
| 21 | only degreasing | 2 | 1.0 | — | — | — | 4 | 4.0 | excellent | 27 |
| 22 | only degreasing | 3 | 1.5 | — | 4.5 | 0.6 | 3 | 4.5 | excellent | 20 |
| 23 | only degreasing | 3 | 1.5 | 1.5 | 3.0 | 0.6 | 3 | 4.5 | excellent | 23 |
| Comparison examples | | | | | | | | | | |
| 13 | only degreasing | — | — | — | — | — | 5 | 5.0 | poor | — |
| 14 | only degreasing | — | — | — | 4.5 | 0.6 | 3 | 4.5 | poor | — |
| 15 | only degreasing | — | — | 1.5 | 3.0 | 0.6 | 3 | 4.5 | fair | 39 |

Note) Mw: Weight-average molecular weight
*1Water-drop contact angle: Parameter of permanency of hydrophilicity (The smaller the contact angle, the better the permanency of hydrophilicity)
*2PAA: Polyacrylic acid (Mw:1,000,000), CMC: Carboxymethyl cellulose (Mw:20.000), Acrylic monomer: N-methylol acrylamide, PEO: Polyethylene oxide(Mw:500,000)

ACTUAL EXAMPLES 24 TO 56 AND COMPARISON EXAMPLES 16 TO 18

Further performance evaluation tests were carried out, comparing the hydrophilic surface-treating solution of this invention (Examples 24 to 56), which contains polyglutamic acid, basic compound and aqueous resin as main components and is further added to with another aqueous resin used as a hardening agent, with the surface-treating solution (Comparison Examples 16 to 18) consisting of aqueous resin without containing polyglutamic acid and basic compound and another aqueous resin used as a hardening agent. The compositions of these surface-treating solutions are shown in Tables 8 and 9, and Table 10 shows the evaluation results. In this test, degreasing and phosphoric chromating treatment were provided as substrate treatments.

TABLE 8

| | Substrate treatment | γ-PGA Mw:300,000 | 28%-ammonia water | Composition(Part by weight) Aqueous resin*1 | | | | | Others PEO |
|---|---|---|---|---|---|---|---|---|---|
| | | | | PAA | PVP | CMC | $H_2ZrF_6$ | Acrylic monomer | |
| Actual examples | | | | | | | | | |
| 24 | Phosphoric chromating | 2 | 1.0 | — | — | — | — | 4 | 4.0 |
| 25 | Phosphoric chromating | 3 | 1.5 | — | — | 4.5 | 0.6 | 3 | 4.5 |
| 26 | Phosphoric chromating | 5 | 2.5 | 1.5 | — | 3.0 | 0.6 | 3 | 4.5 |
| 27 | Phosphoric chromating | 3 | 1.5 | 1.5 | — | 3.0 | 0.6 | 3 | 4.5 |
| 28 | Phosphoric chromating | 1 | 0.5 | 1.5 | — | 3.0 | 0.6 | 3 | 4.5 |
| 29 | Phosphoric chromating | 3 | 1.5 | 1.5 | — | 3.0 | 0.6 | 3 | 2.0 |
| 30 | Phosphoric chromating | 3 | 1.5 | 1.5 | — | 3.0 | 0.6 | 3 | 7.0 |
| 31 | Phosphoric chromating | 3 | 1.5 | 0.3 | — | 3.0 | 0.6 | 3 | 4.5 |
| 32 | Phosphoric chromating | 3 | 1.5 | 3.0 | — | 3.0 | 0.6 | 3 | 4.5 |
| 33 | Phosphoric chromating | 3 | 1.5 | 1.5 | — | 1.0 | 0.6 | 3 | 4.5 |
| 34 | Phosphoric chromating | 3 | 1.5 | 1.5 | — | 5.0 | 0.6 | 3 | 4.5 |
| 35 | Phosphoric | 3 | 1.5 | — | 1.5 | 3.0 | 0.6 | 3 | 4.5 |

TABLE 8-continued

| | Substrate treatment | γ-PGA Mw:300,000 | 28%- ammonia water | Aqueous resin*[1] PAA | PVP | CMC | H₂ZrF₆ | Acrylic monomer | Others PEO |
|---|---|---|---|---|---|---|---|---|---|
| 36 | Phosphoric chromating | 3 | 1.5 | — | 0.3 | 3.0 | 0.6 | 3 | 4.5 |
| 37 | Phosphoric chromating | 3 | 1.5 | — | 3.0 | 3.0 | 0.6 | 3 | 4.5 |
| Comparison examples | | | | | | | | | |
| 16 | Phosphoric chromating | — | — | — | — | — | — | 5 | 5.0 |
| 17 | Phosphoric chromating | — | — | — | — | 4.5 | 0.6 | 3 | 4.5 |
| 18 | Phosphoric chromating | — | — | 1.5 | — | 3.0 | 0.6 | 3 | 4.5 |

*[1]PAA: Polyacrylic acid(Mw:1,000,000), PVP: Polyvinyl pyrrolidone (Mw:20,000), CMC: Carboxymethyl cellulose (Mw:20,000), Acrylic monomer: N-methylol acrylamide, PEO: Polyethylene oxide(Mw:500,000)

TABLE 9

| Actual examples | Substrate treatment | γ-PGA Mw:300,000 | 28%- ammonia water | Aqueous resin*[1] PAA | PVC | CMC | HEC | Poly- amide |
|---|---|---|---|---|---|---|---|---|
| 38 | Phosphoric chromating | 3.0 | 15 | 1.5 | 3 | — | — | — |
| 39 | Phosphoric chromating | 3.0 | 15 | 1.5 | — | — | 3 | — |
| 40 | Phosphoric chromating | 3.0 | 1.5 | 1.5 | — | — | — | 3 |
| 41 | Phosphoric chromating | 3.0 | 1.5 | 1.5 | — | — | — | — |
| 42 | Phosphoric chromating | 3.0 | 1.5 | 1.5 | — | — | — | — |
| 43 | Phosphoric chromating | 3.0 | 1.5 | 1.5 | — | 3 | — | — |
| 44 | Phosphoric chromating | 3.0 | 1.5 | 1.5 | — | 3 | — | — |
| 45 | Phosphoric chromating | 3.0 | 1.5 | 1.5 | — | 3 | — | — |
| 46 | Phosphoric chromating | 1.0 | 1.0 | 1 | 4 | — | — | — |
| 47 | Phosphoric chromating | 0.5 | 1.0 | 1 | 4 | — | — | — |
| 48 | Phosphoric chromating | 4.0 | 1.8 | 1 | 4 | — | — | — |
| 49 | Phosphoric chromating | 1.0 | 1.0 | 1 | 4 | — | — | — |
| 50 | Phosphoric chromating | 1.0 | 1.0 | 1 | 4 | — | — | — |
| 51 | Phosphoric chromating | 1.0 | 1.0 | 0.5 | 4 | — | — | — |
| 52 | Phosphoric chromating | 1.0 | 3.5 | 4 | 4 | — | — | — |
| 53 | Phosphoric chromating | 1.0 | 1.0 | 1 | 2 | — | — | — |
| 54 | Phosphoric chromating | 1.0 | 1.0 | 1 | 8 | — | — | — |
| 55 | Phosphoric chromating | 1.0 | 1.0 | 1 | 4 | — | — | — |
| 56 | Phosphoric chromating | 1.0 | 1.0 | 1 | 4 | — | — | — |

TABLE 9-continued

| | Composition(Part by weight) | | | | | | | |
|---|---|---|---|---|---|---|---|---|
| | Aqueous resin*[1] | | | | | | | |
| Actual examples | Urethane resin | Epoxy resin | Phenolic resin | Melamine resin | Urea resin | $H_2ZrF_6$ | Acrylic monomer | Others PEO |
| 38 | — | — | — | — | — | 0.6 | 3 | 4.5 |
| 39 | — | — | — | — | — | 0.6 | 3 | 4.5 |
| 40 | — | — | — | — | — | 0.6 | 3 | 4.5 |
| 41 | 3 | — | — | — | — | 0.6 | 3 | 4.5 |
| 42 | — | 3 | — | — | — | 0.6 | 3 | 4.5 |
| 43 | — | — | 1 | — | — | — | — | 4.5 |
| 44 | — | — | — | 1 | — | — | — | 4.5 |
| 45 | — | — | — | — | 1 | — | — | 4.5 |
| 46 | — | — | — | — | — | — | 3 | 5.0 |
| 47 | — | — | — | — | — | — | 3 | 5.0 |
| 48 | — | — | — | — | — | — | 3 | 5.0 |
| 49 | — | — | — | — | — | — | 3 | 2.0 |
| 50 | — | — | — | — | — | — | 3 | 10 |
| 51 | — | — | — | — | — | — | 3 | 5.0 |
| 52 | — | — | — | — | — | — | 3 | 5.0 |
| 53 | — | — | — | — | — | — | 3 | 5.0 |
| 54 | — | — | — | — | — | — | 3 | 5.0 |
| 55 | — | — | — | — | — | — | 1 | 5.0 |
| 56 | — | — | — | — | — | — | 5 | 5.0 |

*[1]PAA: Polyacrylic acid(Mw:1,000,000), PVA: Polyvinyl alcohol (Mw:20,000), CMC: Carboxymethyl cellulose (Mw:20,000), HEC: Hydroxyethyl cellulose(Mw;20,000), Polyamide: AQ NYLON P · 70 (manufactured by TORAY IND. INC), Urethane resin: ADEKA BONLITER HUX-232 (manufactured by ASAHI DENKA KOGYO K.K.), Epoxy resin: EPOLSION EA55 (manufactured by KANEBO NSC K.K.), Phenolic resin: RESITOP PL2761 (manufactured by GUNEI CHEMICAL IND. Co.,Ltd), Melamine resin: NIKALAC MW-22 (manufactured by SANWA CHEMIKAL Co., Ltd), Urea resin: UFR-65 (manufactured by HISTUI TOATSU CHEMICAL INC.), Acrylic monomer: N-methylol acrylamide, PEO: Polyethylene oxide(Mw:500,000)

TABLE 10

| | Results of characteristic Evaluation | |
|---|---|---|
| | Film-formability | Water-drop contact angle(°)*[1] |
| Actual examples | | |
| 24 | excellent | 25 |
| 25 | excellent | 18 |
| 26 | excellent | 16 |
| 27 | excellent | 19 |
| 28 | excellent | 23 |
| 29 | excellent | 20 |
| 30 | excellent | 19 |
| 31 | excellent | 21 |
| 32 | excellent | 29 |
| 33 | excellent | 26 |
| 34 | excellent | 22 |
| 35 | excellent | 22 |
| 36 | excellent | 28 |
| 37 | excellent | 25 |
| 38 | excellent | 24 |

TABLE 10-continued

| | Results of characteristic Evaluation | |
|---|---|---|
| | Film-formability | Water-drop contact angle(°)*1 |
| 39 | excellent | 24 |
| 40 | excellent | 24 |
| 41 | excellent | 36 |
| 42 | excellent | 48 |
| 43 | excellent | 38 |
| 44 | excellent | 48 |
| 45 | excellent | 37 |
| 46 | excellent | 25 |
| 47 | excellent | 30 |
| 48 | excellent | 18 |
| 49 | excellent | 24 |
| 50 | excellent | 26 |
| 51 | excellent | 27 |
| 52 | excellent | 31 |
| 53 | excellent | 26 |
| 54 | excellent | 35 |
| 55 | excellent | 21 |
| 56 | excellent | 29 |
| Comparison examples | | |
| 16 | poor | — |
| 17 | poor | — |
| 18 | fair | 38 |

*1Water-drop contact angle: Parameter of permanency of hydrophilicity (The smaller the contact angle, the better the permanency of hydrophilicity)

ACTUAL EXAMPLES 57 TO 65 AND COMPARISON EXAMPLES 19 TO 27

Further performance evaluation tests were carried out, comparing the hydrophilic surface-treating solution of this invention (Examples 57 to 65), which contains polyglutamic acid, basic compound and aqueous resin as main components and is further added to with another aqueous resin used as a hardening agent, with the surface-treating solution (Comparison Examples 19 to 27) consisting of aqueous resin without containing polyglutamic acid and basic compound and another aqueous resin used as a hardening agent. The evaluation results are shown in Table 11. In this test, the substrate treatments employed in the actual examples 57 to 59 and the comparison examples 19 to 21 were degreasing and coating-type chromating treatments. In the actual examples 60 to 62 and the comparison examples 22 to 24, degreasing and zirconium treatment were done as substrate treatments. In the actual examples 63 to 65 and the comparison examples 25 to 27, degreasing and phenol series resin primer processing were carried out as substrate treatments.

TABLE 11

| | Substrate treatment | Composition(Part by weight) | | | |
|---|---|---|---|---|---|
| | | γ-PGA Mw:300,000 | 28%-ammonia water | Aqueous resin*2 PAA | CMC |
| Actual examples | | | | | |
| 57 | Coating-type chromating | 2 | 1.0 | — | — |
| 58 | Coating-type chromating | 3 | 1.5 | — | 4.5 |
| 59 | Coating-type chromating | 3 | 1.5 | 1.5 | 3.0 |
| 60 | Zirconic agent treating | 2 | 1.0 | — | — |
| 61 | Zirconic agent treating | 3 | 1.5 | — | 4.5 |
| 62 | Zirconic agent treating | 3 | 1.5 | 1.5 | 3.0 |
| 63 | Phenolic resin primer | 2 | 1.0 | — | — |
| 64 | Phenolic resin primer | 3 | 1.5 | — | 4.5 |
| 65 | Phenolic resin primer | 3 | 1.5 | 1.5 | 3.0 |
| Comparison examples | | | | | |
| 19 | Coating-type chromating | — | — | — | — |
| 20 | Coating-type chromating | — | — | — | 4.5 |
| 21 | Coating-type chromating | — | — | 1.5 | 3.0 |
| 22 | Zirconic agent treating | — | — | — | — |
| 23 | Zirconic agent treating | — | — | — | 4.5 |
| 24 | Zirconic agent treating | — | — | 1.5 | 3.0 |
| 25 | Phenolic resin primer | — | — | — | — |

TABLE 11-continued

| | | | | | |
|---|---|---|---|---|---|
| 26 | Phenolic resin primer | — | — | — | 4.5 |
| 27 | Phenolic resin primer | — | — | 1.5 | 3.0 |

| | Composition(Part by weight) | | | | |
|---|---|---|---|---|---|
| | Aqueous resin*2 | | Others | Film- | Water-drop |
| | $H_2ZrF_6$ | Acrylic monomer | PEO | formability | contact angle (°)*1 |
| Actual examples | | | | | |
| 57 | — | 4 | 4.0 | excellent | 24 |
| 58 | 0.6 | 3 | 4.5 | excellent | 18 |
| 59 | 0.6 | 3 | 4.5 | excellent | 19 |
| 60 | — | 4 | 4.0 | excellent | 22 |
| 61 | 0.6 | 3 | 4.5 | excellent | 23 |
| 62 | 0.6 | 3 | 4.5 | excellent | 18 |
| 63 | — | 4 | 4.0 | excellent | 27 |
| 64 | 0.6 | 3 | 4.5 | excellent | 27 |
| 65 | 0.6 | 3 | 4.5 | excellent | 28 |
| Comparison examples | | | | | |
| 19 | — | 5 | 5.0 | poor | — |
| 20 | 0.6 | 3 | 4.5 | poor | — |
| 21 | 0.6 | 3 | 4.5 | fair | 42 |
| 22 | — | 5 | 5.0 | poor | — |
| 23 | 0.6 | 3 | 4.5 | poor | — |
| 24 | 0.6 | 3 | 4.5 | fair | 40 |
| 25 | — | 5 | 5.0 | poor | — |
| 26 | 0.6 | 3 | 4.5 | poor | — |
| 27 | 0.6 | 3 | 4.5 | fair | 52 |

Note) Mw: Weight-average molecular weight
*1Water-drop contact angle: Parameter of permanency of hydrophilicity (The smaller the contact angle, the better the permanency of hydrophilicity)
*2PAA: Polyacrylic acid(Mw:1,000,000), CMC: Carboxymethyl cellulose (Mw:20,000), Acrylic monomer: N-methylol acrylamide, PEO: Polyethylene oxide(Mw:500,000)

From these results, it is apparent that the present invention provides an improved and effective hydrophilic surface-treating aqueous solution and hydrophilic surface-treating method, which enables the forming of a hydrophilic film which can maintain a superior hydrophilicity and a low water-contact angle even after 20 repetitions of warming cycle.

The surface-treating solution and film coating of this invention are applicable not only to the fins of the heat exchanger but also to anything which requires condensation-proof and antistatic properties. Applications requiring condensation-proof properties are glass or plastic usage in automobiles, electrical control equipment, and the inner surface of watches or other instrument panels, which aim at improving visibility (anti-fogging treatment). The condensation-proof properties are also applicable to the inner walls of houses, window glass, or food containers for juice, beer and so on. If intending to improve the utilization efficiency of the sunlight, the present invention is useful in preventing the condensation in a vinyl house.

Applications requiring the anti-static properties are, for example, electronic equipment. Since the surface-treating solution and film coating of the present invention has stronger polarity and higher hydrophilicity, they can be used for the antistatic treatment of various electronic equipment.

As has been described above, according to the hydrophilic surface-treating aqueous solution and surface-treating method of this invention, there can be obtained an improved hydrophilic film having high hydrophilic permanency and anti-corrosion properties. The odor is also remarkably suppressed. Since polyglutamic acid (PGA) is a resin having a superior hydrophilicity, once the surface-treating solution containing polyglutamic acid is applied onto the materials, it is not dissolved by water under regular conditions. Also by employing the volatile basic compound, it is volatilized by the baking process following the coating, and an insoluble hydrophilic film containing PGA is solely left on the surface of the material, which allows the film to maintain its hydrophilicity. Meanwhile, since polyglutamic acid is easily dissolved by the aqueous solution containing the basic compound, the surface-treating solution is uniformly applied onto the surface of the aluminum or aluminum alloy.

What is claimed is:

1. The hydrophilic surface-treating method comprising the steps of:

degreasing a material to be treated made of aluminum or an aluminum-alloy;

optionally subjecting said material to anticorrosion treatment;

treating said material with a hydrophilic surface-treating aqueous solution which comprises polyglutamic acid and a basic compound having a boiling point of less than 200 degrees Celsius; and drying said material via a baking process.

2. The hydrophilic surface-treating method comprising the steps of:

degreasing a material to be treated made of aluminum or an aluminum-alloy;

optionally subjecting said material to anticorrosion treatment;

treating said material with a hydrophilic surface-treating aqueous solution comprising polyglutamic acid, a basic compound having a boiling point of less than 200 Celsius, and an aqueous resin; and drying said material via a baking process.

3. The hydrophilic surface-treating method according to claim 1, wherein said polyglutamic acid has a weight average molecular weight of 10,000 to 2,000,000, and the amount of said basic compound is that which neutralizes 10% to 200% of said polyglutamic acid.

4. The hydrophilic surface-treating method according to claim 2, wherein said polyglutamic acid has a weight average molecular weight of 10,000 to 2,000,000, and the amount of said basic compound is that which neutralizes 10% to 200% of said polyglutamic acid.

* * * * *